(12) United States Patent
Goto et al.

(10) Patent No.: US 7,614,487 B2
(45) Date of Patent: Nov. 10, 2009

(54) FRICTIONAL ENGAGEMENT APPARATUS

(75) Inventors: Shintaro Goto, Toyota (JP); Naoki Kato, Aichi-gun (JP); Terasu Harashima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 425 days.

(21) Appl. No.: 11/527,500

(22) Filed: Sep. 27, 2006

(65) Prior Publication Data
US 2007/0080041 A1    Apr. 12, 2007

(30) Foreign Application Priority Data
Oct. 6, 2005    (JP) .............................. 2005-294174

(51) Int. Cl.
F16D 25/0638    (2006.01)
F16B 21/18    (2006.01)
(52) U.S. Cl. ............... 192/87.15; 192/48.91; 192/87.11
(58) Field of Classification Search ............... 192/87.1, 192/87.11, 87.14, 87.15; 403/DIG. 7; 411/517, 411/518, 519
See application file for complete search history.

(56) References Cited

U.S. PATENT DOCUMENTS 3,313,385 A * 4/1967 Forster ...................... 192/70.2
3,662,642 A * 5/1972 Bernard ....................... 411/518
6,280,335 B1 * 8/2001 Wehner et al. .............. 411/517
2006/0021845 A1 * 2/2006 Onishi et al. .............. 192/85 A

FOREIGN PATENT DOCUMENTS

| JP | 9-53691 | 2/1997 |
|---|---|---|
| JP | 2003-42184 | 2/2003 |
| JP | 2003-106341 | 4/2003 |

* cited by examiner

Primary Examiner—Rodney H Bonck
(74) Attorney, Agent, or Firm—Oblon, Spivak, McClelland, Maier & Neustadt, L.L.P.

(57) ABSTRACT

A frictional engagement apparatus is provided. The frictional engagement apparatus includes a first frictional engagement unit, a second frictional engagement unit disposed axially spaced from the first frictional engagement unit, and one case that supports the first and the second frictional engagement units non-rotatably circumferentially but shiftably axially relative thereto. One retaining ring is fitted to the case so as to be located between the first and second frictional engagement units. The retaining ring is abutted to the nearest first friction plate and/or the second friction plate to stop an approaching shift of the first frictional engagement unit and/or the second frictional engagement units. The retaining ring includes a u-shaped cross section defined by an annular recess that extends in a circumferential direction of the retaining ring at a radially interior portion of the retaining ring.

11 Claims, 5 Drawing Sheets

|  | C1 | C2 | B1 | B2 | B3 |
|---|---|---|---|---|---|
| 1st | ○ |  |  | ○ |  |
| 2nd | ○ |  | ○ |  |  |
| 3rd | ○ |  |  |  | ○ |
| 4th | ○ | ○ |  |  |  |
| 5th |  | ○ |  |  | ○ |
| 6th |  | ○ | ○ |  |  |
| Rev |  |  |  | ○ | ○ |

FRICTIONAL ENGAGEMENT APPARATUS

The present application is based on Japanese Patent Application No. 2005-294174 filed on Oct. 6, 2005, the content of which is incorporated herein by reference.

BACKGROUND OF THE INVENTION

1. Field of the Invention

The present invention relates to a frictional engagement apparatus mounted, for example, in an automatic transmission for vehicle. In particular, it relates to the frictional engagement apparatus of small-size and light-weight.

2. Related Art

Conventionally, an automatic transmission for vehicle provided with plural planetary gear apparatuses and plural frictional engagement apparatuses has been known and practically used. In this automatic transmission for vehicle, plural rotary elements constructed through connection of the plural planetary gears are suitably engaged or released by the plural frictional engagement apparatuses to establish plural speed change ratios. With recent multi speed change ratios of the automatic transmission for vehicle, more planetary gear apparatuses and more frictional engagement apparatuses are mounted on the automatic transmission for vehicle. For example, the Patent Document 1 (Japanese Patent Application Laid-open No. 9-53691) discloses two clutch apparatuses as the frictional engagement apparatuses.

On the other hand, the more planetary gear apparatuses and the more frictional engagement apparatuses cause problems of large-size and heavy-weight of the automatic transmission for vehicle. To overcome such the problem, some techniques including the above Patent Document 1 for realizing the small-size and the light-weight have been developed.

FIG. 6 shows a conventional automatic transmission for vehicle 100 disclosed in the above Patent Document 1. The automatic transmission for vehicle 100 includes a clutch drum 102 and two sets of frictional engagement units 104 and 108. In detail, the clutch drum 102 has a drum shape and is commonly used for the two sets of frictional engagement units 104 and 108. Both the first frictional engagement unit 104 and the second frictional engagement unit 108 are disposed at an inner periphery of the clutch drum 102 and respectively include plural friction plates arranged axially.

In the first frictional engagement unit 104, plural friction plates 105 held by the clutch drum 102 and plural friction plates 107 held by a clutch hub 106 are alternately arranged. Similarly, in the second frictional engagement unit 108, plural friction plates 109 held by the clutch drum 102 and plural friction plates 111 held by a ring R are alternately arranged.

On an inner surface of the clutch drum 102, between the first frictional engagement unit 104 and the second frictional engagement unit 108, a stop ring 112 is held so as not to be shifted axially and not to be rotated circumferentially relative to the clutch drum 102. Commonly using the stop ring 112 for both the first frictional engagement unit 104 and the second frictional engagement unit 108 can shorten an axial length of the automatic transmission for vehicle 100.

In the frictional engagement apparatus of the Patent Document 1, as shown in FIG. 7, a first piston 114 disposed behind the first frictional engagement unit 104 pushes it. Thus, the friction plates 105 and the friction plates 107 are brought into contacted state, and the stop ring 112 is deformed toward the second frictional engagement unit 108. The deformation of the second frictional engagement unit 108 causes contact between the friction plates 109 and the friction plates 111, so that these friction plates 109 and 111 may be deteriorated in durability thereof. For this reason, improvement for avoiding such unexpected contact of the friction plates 109 and 111 has been required.

On the other hand, when a piston 116 pushes the second frictional engagement unit 108, the stop ring 112 deforms toward the first frictional engagement unit 104 to deteriorate durability of the friction plates 105 and the friction plates 107.

SUMMARY OF THE INVENTION

The present invention is made in view of the above circumstances and has an object to provide a frictional engagement apparatus which can shorten an axial length thereof and in turn an axial length of an automatic transmission, without deteriorating a function thereof in turn a function of the automatic transmission.

For achieving the above object, the frictional engagement apparatus of the present invention (i) comprising a first frictional engagement unit including plural first friction plates, a second frictional engagement unit including plural second friction plates and being disposed axially spaced from the first frictional engaging unit, and one case for supporting the first frictional engagement unit and the second frictional engagement unit non-rotatable circumferentially but shiftable axially relative thereto, (ii) wherein one retaining ring is fitted to the case to be located between the first frictional engagement unit an the second frictional engagement unit, the retaining ring being abutted to the nearest first friction plate and/or the nearest second friction plate to stop an approaching shift of the first frictional engagement unit and/or the second frictional engagement unit, and (iii) at a portion of the retaining ring remote from the case a recess is formed for allowing an elastic deformation in a direction decreasing thickness thereof, when the first frictional engagement unit and the second frictional engagement unit approach to each other.

According to the frictional engagement apparatus according to the invention recited in the claim 1, even when the retaining ring is deformed in the direction decreasing thickness thereof by being pressed with one of the first and second frictional engagement units, deformation of the retaining ring is absorbed within the recess portion. As a result, influence to the other of the first and second frictional engagement units is prevented.

As regard the case, it may be a rotatable clutch drum of hollow cylindrical shape mounted in an automatic transmission for vehicle, and on an inner peripheral surface thereof the first frictional engagement unit and the second frictional engagement unit are supported. By supporting the retaining ring on the inner peripheral surface of the clutch drum, the recess is formed on the inner peripheral surface thereof. The clutch drum has a hollow cylindrical portion on which plural concave grooves spaced circumferentially, extended axially and concaved radially outwardly are formed, and each of the first friction plates and each of the second friction plates have convex portions at an outer periphery thereof to be engaged with the concave grooves. The hollow cylindrical portion is provided with a support groove for supporting the retaining ring therein.

The retaining ring has C-shape in a non-fitted state, and is reduced in a diameter upon fitting to the hollow cylindrical portion. The recess formed on an inner peripheral surface of the retaining ring has a predetermined width and depth, and a pair of ring portions are formed at axially both sides thereof. Here, shape and size of the recess and the paired ring portions are so selected that deformation of one of the first ring portions and the second ring portions does not affect the other of them.

As regard the first frictional engagement unit and the second frictional engagement unit, a radially outer part of the first friction plate nearest to the retaining ring, and a radially outer part of the second friction plate nearest to the retaining ring are abutted to the retaining ring. Further, the frictional engagement apparatus can include, in addition to the first and second frictional engagement units, the case and the retaining ring, a first piston and a second piston respectively pressing the first frictional engagement unit and the second frictional engagement unit toward the retaining ring. The first piston and the second piston can be operated independently, to thereby operate only the first frictional engagement unit, only the second frictional engagement unit, or both the first and second frictional engagement unit.

DETAILED DESCRIPTION OF THE PREFERRED EMBODIMENT

Hereinafter, an embodiment of the present invention will be explained in detail with reference to attached drawings.

Figures 1, 2:
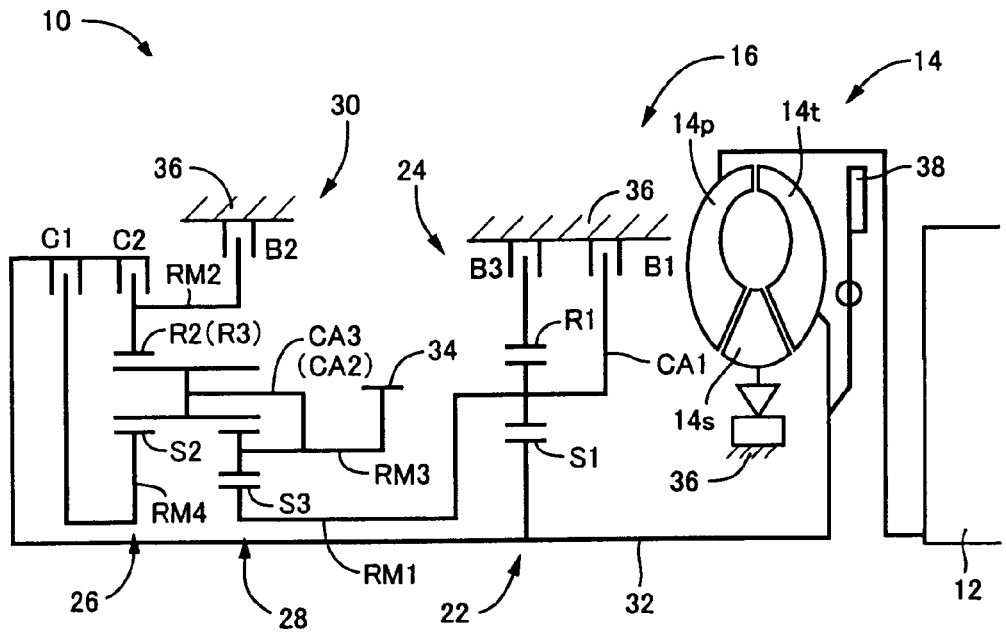
FIG. 1 is a conceptual view of an automatic transmission for vehicle to which the present invention is applied.
FIG. 2 is a diagram showing engagement of clutches and brakes for establishing each of speed change ratios for the automatic transmission for vehicle shown in FIG. 1.

FIG. 1 schematically shows a construction of a driving apparatus for vehicle 10 to which the present invention is applied. The driving apparatus 10 is mounted onto, e.g., an FF (front-engine, front-drive) type vehicle, and includes an engine 12 as a driving source. An output of the engine 12 constructed by an internal combustion engine is transmitted to right and left driving wheels via a torque converter 14 functioning as a hydraulic type transmitting device, an automatic transmission for vehicle 16, a differential gear unit (not shown), and a pair of axles. Here, the automatic transmission for vehicle 16 and the torque converter 14 have a construction substantially symmetrical with respect to a horizontal centerline, and therefore a lower half thereof is not omitted in FIG. 1.

The torque converter 14 includes a pump impeller 14p connected to a crankshaft of the engine 12, a turbine impeller 14t connected to an input shaft 32 of the automatic transmission for vehicle 16, and a stator impeller 14s connected to a housing case 36 via a one-way clutch (not shown) transmitting the rotation in one direction but does not transmit the rotation in other direction. The torque converter 14 amplifies the torque produced by the engine 12 and transmits the amplified torque to the automatic transmission for vehicle 16. Between the pump impeller 14p and the turbine impeller 14t, a lockup clutch 38 is provided for allowing the pump impeller 14p and the turbine impeller 14t to be rotated integrally by an engagement therebetween.

The automatic transmission for vehicle 16 includes a first transmission portion 24 and a second transmission portion 30. The first transmission portion 24 is mainly constructed by a single-pinion type first planetary gear set 22. The second transmission portion 30 is mainly constructed by a single-pinion type second planetary gear set 26 and a double-pinion type third planetary gear set 28, and is coaxial with the first transmission portion 24.

The automatic transmission for vehicle 16 speed changes rotation of an input shaft 32 disposed upstream of the first planetary gear set 22, and output the speed changed rotation from an output gear 34 disposed downstream of the third planetary gear set 28. Here, the input shaft 32 corresponding to a claimed input member is a turbine shaft rotated integrally with the turbine impeller 14t. The output gear 34 corresponding to a claimed output member meshes with the differential gear unit via a counter shaft or directly to drive and rotate the left and right driving wheels.

The first planetary gear set 22 constructing the first transmission portion 24 includes three rotary elements, i.e., a sun gear S1, a carrier CA1 and a ring gear R1. The sun gear S1 is connected to the input shaft 32 to be driven and rotated thereby, and the ring gear R1 is selectively connected via a third brake B3 to a housing case 36 which is a non-rotary member, the carrier CA1 functioning as an intermediate output member is rotated at a speed lower than that of the input shaft 32.

The second planetary gear set 26 and the third planetary gear set 28 constructing the second transmission portion 30 are partially connected to each other to provide four rotary elements RM1, RM2, RM3 and RM4. Specifically, a sun gear S3 of the third planetary gear set 28 provides the first rotary element RM1; respective ring gears R2 and R3 of the second and third planetary gear sets 26 and 28 are connected to each other to provide the second rotary element RM2; respective carriers CA2 and CA3 of the second and third planetary gear sets 26 and 28 are connected to each other to provide the third rotary element RM3; and a sun gear S2 of the second planetary gear set 26 provides the fourth rotary element RM4.

Thus, the second and third planetary gear sets 26 and 28 provide a Ravigneaux-type planetary gear train in which the respective ring gears R2 and R3 of the second and third planetary gear sets 26 and 28 are constituted integrally with each other; the respective carriers CA2 and CA3 of the second and third planetary gear sets 26 and 28 are constituted by a common member; and the pinion gears of the first planetary gear set 26 also function as the second pinion gears of the third planetary gear set 28.

The first rotary element RM1 (sun gear S3) is selectively connected by the first brake B1 to the housing case 36 to be inhibited from being rotated relative thereto, and the second rotary element RM2 (ring gears R2 and R3) is selectively connected by the second brake B2 to the housing case 36 to be inhibited from being rotated relative thereto. The fourth rotary element RM4 (sun gear S2) is selectively connected by the first clutch C1 to the input shaft 32 to be rotated integrally therewith, and the second rotary element RM2 (ring gears R2 and R3) is selectively connected by the second clutch C2 to the input shaft 32 to be rotated integrally therewith.

The first rotary element RM1 (sun gear S3) is integrally connected to the carrier CA1 of the first planetary gear set 22 functioning as the intermediate output member to be rotated integrally therewith thereby outputting the rotation, and the third rotary element RM3 (carriers CA2 and CA3) is integrally connected to the output gear 34 to be rotated integrally therewith thereby outputting the rotation. The first to third brakes B1 to B3, and the first and second clutches C1 and C2 are multiple disc hydraulic type frictional engagement apparatus which are engaged and released by hydraulic cylinders.

FIG. 2 shows an operation table representing a relationship between the speed change ratios of the automatic transmission for vehicle 16, and a plurality of combinations of respective operating states of the first and second clutches C1 and C2, and the first, second and third brakes B1, B2 and B3 to establish those speed change ratios. In the operation table, symbol "O" indicates an engaged state of each of the clutches C1 and C2, and each of the brakes B1 to B3. No symbol (blank) indicates an disengaged state of each clutch and each brake.

In the automatic transmission for vehicle 16 of this embodiment, any two of the two clutches C1 and C2, and three brakes B1 to B3 are engaged with each other to establish the multiple speed change ratio type transmission having six forward speed change ratios and one rearward speed change ratio. For example, the first clutch C1 and the second brake B2 are engaged to establish the forward 1st speed change ratio.

Figure 3:
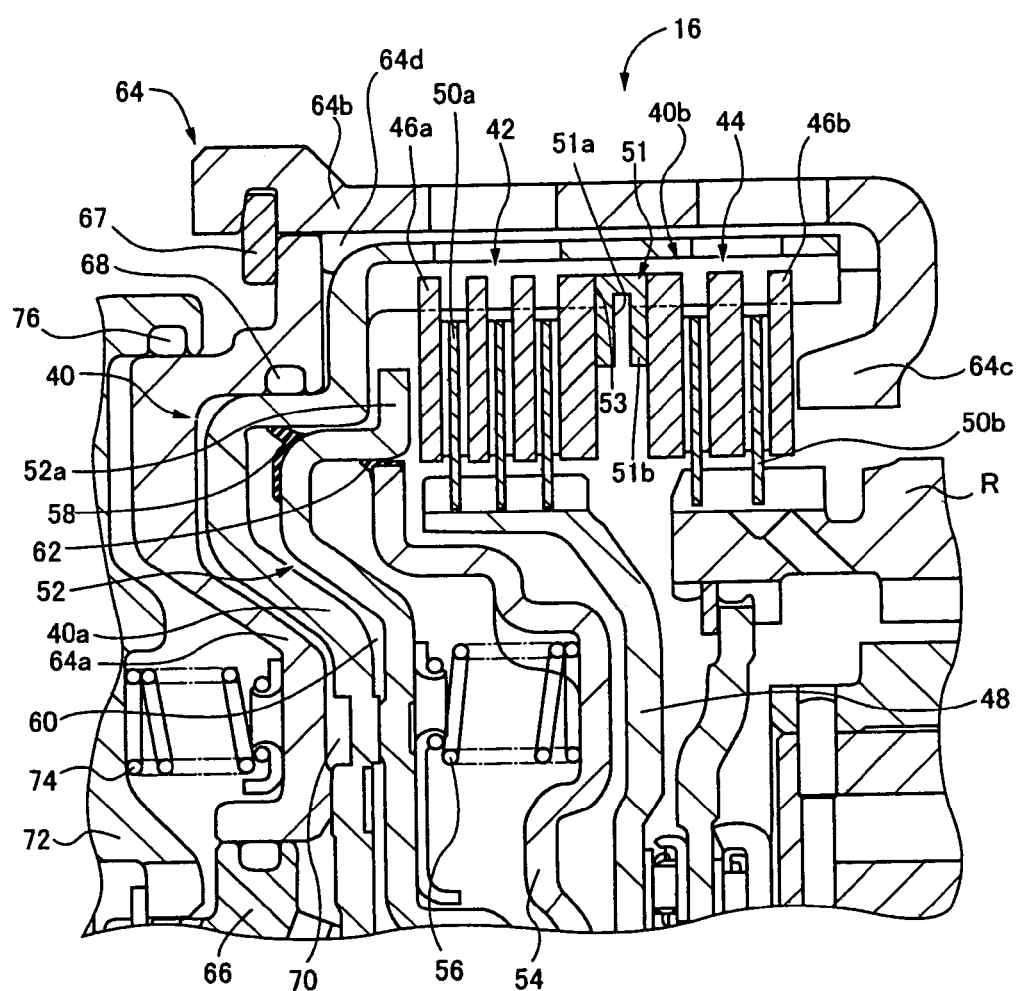
FIG. 3 is a longitudinal sectional view showing construction the automatic transmission for vehicle shown in FIG. 1 and shows one embodiment of the present invention.
Figure 4:
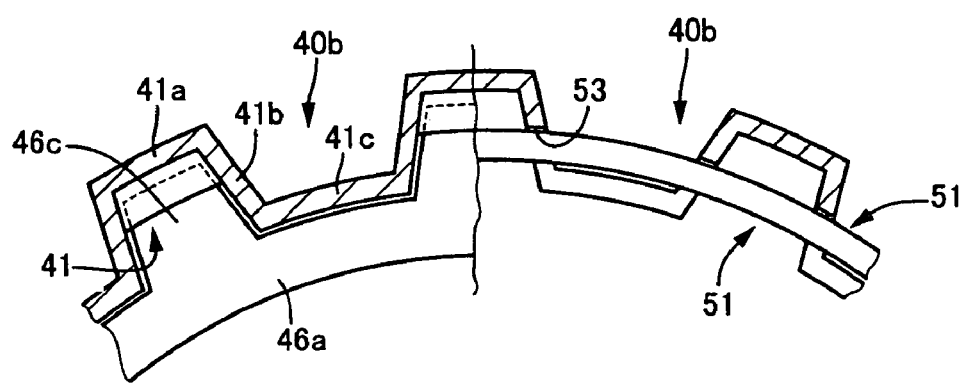
FIG. 4 is a lateral sectional view of a hollow cylindrical portion and the like in FIG. 1.

FIG. 3 is a partial sectional view showing a detail structure of the second speed change portion 30 of the automatic transmission for vehicle 16 to which the present invention is applied. FIG. 4 is a lateral sectional view of the hollow cylindrical portion 40b and the like. More specifically, a left half of FIG. 4 is the sectional view at the position offset from the snap ring 51, and a right half thereof is the sectional view at the position including the snap ring 51.

In FIGS. 3 and 4, the automatic transmission for vehicle 16 includes, in radially inside of a drum 40 of which one axial end is closed, a first frictional element 42 and a second frictional engagement unit 44. The first frictional element 42 is positioned at the opened side, while the second frictional engagement unit 44 is positioned at the closed side. The drum 40 is connected to the input shaft 32 shown in FIG. 1 to be always rotated integral therewith, and corresponds to the claimed clutch drum. The drum 40 is comprised of a bottom plate portion 40a of substantially disc shape, and a hollow cylindrical portion 40b connected to an outer periphery thereof.

As shown in FIGS. 3 and 4, the hollow cylindrical portion 40b is provided with plural concave grooves 41 each protruding radial inwardly. The plural concave grooves 41 are spaced circumferentially by a predetermined pitch. Each concave groove 41 has a bottom part 41a and a pair of incline parts 41b continuing to both sides thereof, and extends over full length of the hollow cylindrical portion 40b. Between the adjacent concave grooves 41, a convex bead 41c convexed radially inwardly and extending axially is formed to function as a spline tooth. The plural friction plates 46b construct the second frictional engagement unit 44 positioned at the open side of the hollow cylindrical portion 40b, while the plural friction plates 46a construct the first frictional engagement unit 42 positioned at the open side thereof. Protrusions (convex portion) 46c formed at an outer periphery of the friction plate 46a and the like engage with the convex grooves 41c. Thus, the friction plates 46a and the friction plate 46b can be shifted axially relative to the hollow cylindrical portion 40b, but can not be rotated circumferentially relative thereto.

The first frictional engagement unit 42 corresponding to the first clutch C1 in FIG. 1 includes plural friction plate 46a and plural friction plates 50a. The friction plates 46a are spline-engaged with the hollow cylindrical portion 40b, while the friction plates 50a positioned between the adjacent friction plates 46a are spline-engaged with an outer peripheral surface of a clutch hub 48 which transmits the rotation to the sun gear S2 of the second planetary gear set 26.

The second frictional engagement unit 44 corresponding to the second clutch C2 in FIG. 1 includes plural friction plate 46b and plural friction plates 50b. The friction plates 46b are spline-engaged with the hollow cylindrical portion 40b, while the friction plates 50b positioned between the adjacent friction plates 46b are spline-engaged with an outer peripheral surface of the ring gear R. The ring gear R corresponds to the ring gears R2 and R3 of the second planetary gear set 26 and the third frictional engagement unit 28 commonly used.

Between the first frictional engagement unit 42 and the second frictional engagement unit 44 in the axial direction of the hollow cylindrical portion 40b, a snap ring 51 is held thereby. The snap ring 51 is made of a spring steel and has a C shape in a normal (non-fitted) state, and a rectangular shape in cross section. By elastically deforming such that both opposed ends approach, diameter of the snap ring 51 decreases. The snap ring 51 is fitted into a circumferential groove 53 formed in convex bead 41c and the incline parts 41b of the hollow cylindrical portion 40b not to be shifted axially. To one end surface and other end surface of the snap ring 51, an inner end surface of the friction plate 46a and that of the friction plate 46b can be abutted respectively. Thus, the snap ring 51 can prohibit the first frictional engagement unit 42 and the second frictional engagement unit 44 from axially shifting to approach to each other beyond a predetermined axial position.

On an inner peripheral surface of the snap ring 51, a C-shape groove 51a of a predetermined width and depth is formed. The snap ring 51 corresponds to a claimed stop ring, while the groove 51a corresponds to a claimed recess. Formation of the groove 51a provides a pair of rings 51b and 51c protruding radially inwardly and are deformable axially. To one ring 51b the first frictional engagement unit 42 abuts, and to the other ring 51c the second frictional engage element 44 abuts. The snap ring 51 has a U-shape cross section in which a radially outer part is continuous while an radially inner part is interrupted by the groove 51a.

Thus, the snap ring 51 elastically deforms, when depressing force is applied by the depressing portions 52a or 64c, in the radially inner part far remote from the hollow cylindrical portion 40b to reduce the thickness thereof. In detail, one of the paired rings 51b and 51c elastically deforms toward the other thereof.

Between the bottom plate 40a portion of the drum 40 and the clutch hub 48, a first clutch piston 52 near to the bottom plate 40a and a spring support plate 54 near to the spring support plate 54 are disposed. The first clutch piston 52 corresponding to a claimed first piston is axially shiftable, and has at a radially outer periphery a press portion 52a for pressing the first frictional engagement unit 42. It presses the first frictional engagement unit 42 axially toward the snap ring 51 to bring the friction plates 46a and 50a engaged state with each other.

The spring support member 54 is abutted at an inner periphery thereof to a snap ring (not shown) which can not be displaced axially, so that an outer periphery can be displace axially. Between the spring support plate 54 and the first clutch piston 52, a return spring 56 is interposed to bias the first clutch piston 52 toward the bottom plate 40a of the drum 40.

A chamber formed between the drum 40 and the first clutch piston 52 is kept in an oil-tight state by an oil seal 58 interposed therebetween. This oil-tight chamber functions as a first oil chamber 60 for rendering an impulsive force to shift the first clutch piston 52 axially. A chamber formed between the first clutch piston 52 and the spring support plate 54 is kept in an oil-tight state by an oil seal 62 interposed therebetween. This chamber functions as so-called centrifugal hydraulic pressure cancel chamber.

A second clutch piston 64 is disposed so as to cover the drum 40. The second clutch piston 64 corresponding to a claimed second piston includes a bottom plate portion 64a, and a hollow cylindrical portion 64b. An inner periphery of the bottom plate portion 64a of hollow disc shape is fitted on an outer periphery of a base member 66 via a seal ring to be shiftable axially. The hollow cylindrical portion 64b of substantially hollow cylindrical shape is connected to an outer periphery of the bottom plate portion 64a.

At axially one open end of the hollow cylindrical portion 64b a press portion 64c is formed to protrude radially inwardly and axially. The press portion 64c press the second frictional engagement unit 44 toward the snap ring 51, so that the friction plates 46b and 50b are brought engaged state with each other. On an inner peripheral surface at other closed axial end of the hollow cylindrical portion 64b, a snap ring 67 protruding radially inwardly is fitted. The snap ring 67 has an end surface to which an end surface of the outer periphery of the bottom plate portion 64a is abutted.

On an inner peripheral surface of the hollow cylindrical portion 64b, plural protrusions 64d having a longitudinal shape circumferentially are protruded radially inwardly such that one end surface thereof is abutted to an end surface of the outer periphery of the bottom plate portion 64a. In this way, the outer periphery of the bottom plate portion 64a is fixed non-shiftably in the axial direction relative to the hollow cylindrical portion 64b. The outer peripheral surface of the hollow cylindrical portion 40b of the drum 40 is engaged with the protrusion 64d, whereby the drum 40 and the second clutch piston 64 are rotated integrally.

A chamber formed between the bottom plate portion 64a of the second clutch piston 64 and the bottom plate 40a of the drum 40 is kept in an oil-tight state by a seal ring 68 interposed therebetween. This oil-tight chamber functions as a second oil chamber 70 for rendering an impulsive force to shift the second clutch piston 64 axially.

At a side of the bottom plate portion 64a opposite to the second oil chamber 70, a spring support member 72 is abutted at an inner periphery thereof to a snap ring (not shown) non-shiftably in the axial direction, so that the outer periphery can be displaced axially. Between the spring support plate 72 and the bottom plate portion 64a, a return spring 74 is interposed to bias the second clutch piston 64 toward the drum 40.

A chamber formed between the spring support 72 and the bottom plate portion 64a is kept in an oil-tight state by a seal ring 76 interposed therebetween. This chamber functions as so-called centrifugal hydraulic pressure cancel chamber.

Next, an operation of the automatic transmission for vehicle 16 thus constructed will be explained. In FIGS. 1 to 3, upon supplying of an operating oil from an operating oil supplying source (not shown) to the first oil chamber 60, the first clutch piston 52 shifts axially toward the clutch hub 48. The press portion 52a presses the first frictional engagement unit 42 to thereby bring the first clutch C1 into engaged state.

On the other hand, upon supplying of an operating oil to the second oil chamber 70, the second clutch piston 64 shifts axially toward the spring support plate 72. The press portion 64a presses the second frictional engagement unit 44 to thereby bring the second clutch C2 into engaged state. Here, on account of independent oil supplying to the first clutch piston 52 and the second clutch piston 64 from separated oil sources, the first and second clutch pistons 52 and 54 can be operated independently to establish the fourth speed state shown in FIG. 2, for example.

Figure 5:
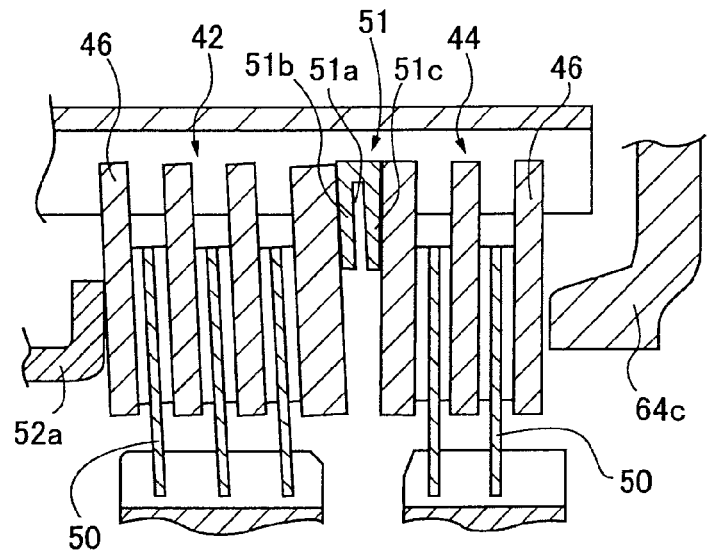
FIG. 5 is a view for explaining an operation when a frictional engagement unit shown in FIG. 3 is pressed.
Figure 6:
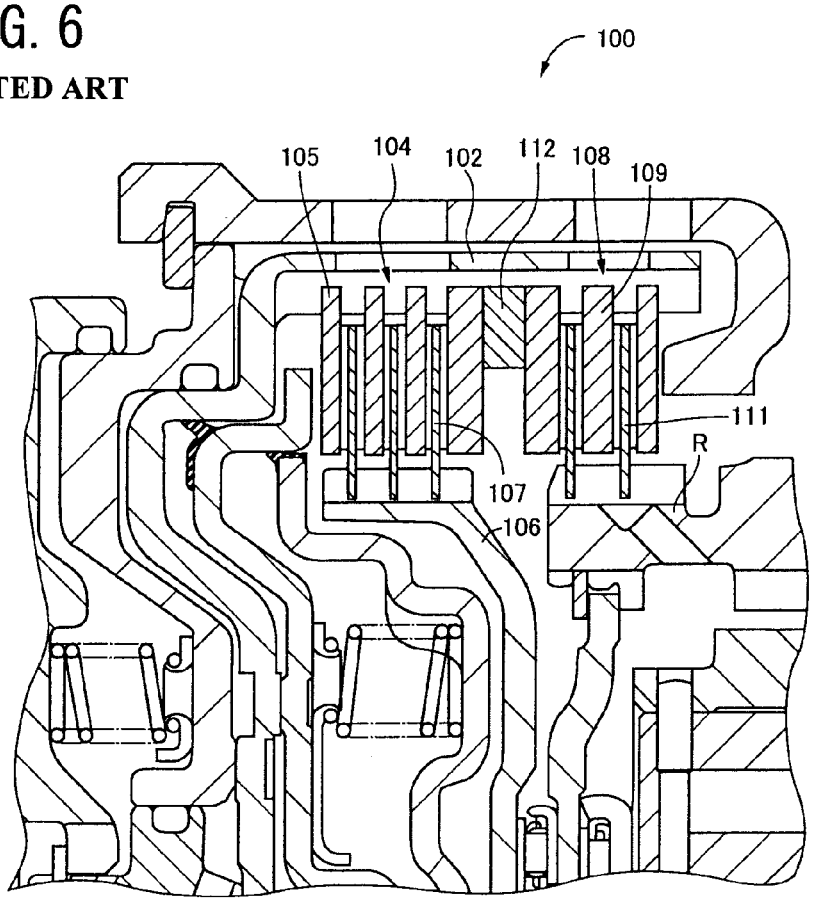
FIG. 6 is a longitudinal sectional view showing construction of a conventional automatic transmission for vehicle.
Figure 7:
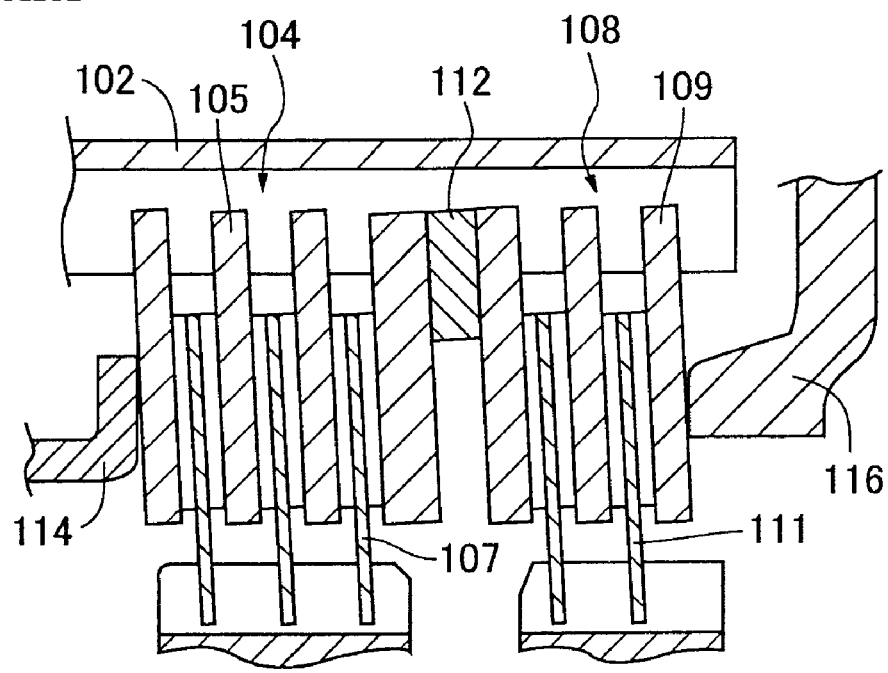
FIG. 7 is a view for explaining an operation when a frictional engagement unit shown in FIG. 6 is pressed.

FIG. 5 is a view for explaining an operated state of the first frictional engagement unit 42 and the second frictional engagement unit 44, when the press portion 52a of the first clutch piston 52 presses the first frictional engagement unit 42. Being presses by the press portion 52a, the friction plates 46a and the friction plates 50a of the first frictional engagement unit 42 inclines relative to a direction perpendicular to the axis. With inclination of the friction plate 46a, the ring portion 51b elastically deforms in the axial direction of the snap ring 51 to reduce thickness thereof.

This elastic deformation of the ring portion 51b is permitted by the C-shape groove 51a, that is, the ring portion 51b deforms axially within the space defined by the groove 51a. For this reason, the elastic deformation of the ring portion 51b does not affect the ring portion 51c at the side of the second frictional engagement unit 44. In this way, even when the first frictional engagement unit 42 is pressed, affect thereof is not transmitted to the second frictional engagement unit 44. Incidentally, when the press portion 64c of the second friction piston 64 presses the second frictional engagement unit 44, an influence thereof is not transmitted to the first frictional engagement units 42.

According to the embodiment described above, following advantages can be obtained. Firstly, between the first frictional engagement unit 42 and the second frictional engagement unit 44, the snap ring 51 is disposed to commonly function as the stopper, and the snap ring 51 is provided with the groove 51a in the inner periphery thereof. As a result, even when the ring portion 51b or the ring portion 51c is deformed by pressing of the first frictional engagement unit 42 or the second frictional engagement unit 44, such the deformation is absorbed by the groove 51a. Thus, the second frictional engagement unit 44 is not affected by deformation of the ring portion 51b, and the first frictional engagement unit 42 is not affected by deformation of the ring portion 51c.

In addition, using one snap ring 51 commonly as the stopper for the first frictional engagement unit 42 and the second frictional engagement unit 44 is effective to shorten the axial length of the automatic transmission for vehicle 16, compared to a case where two snap rings are respectively provided for the first and second frictional engagement units 42 and 44. Further, due to small thickness (axial dimension), the snap ring 51 disposed between the first frictional engagement unit 42 and the second frictional engagement unit 44 does not practically increase the axial dimension. In addition, the C-shape snap ring 51 having the rectangular cross section is light in weight.

In addition, the first clutch piston 52 pressing the first frictional engagement unit 42 and the second clutch piston 64 pressing the second frictional engagement unit 44 are operated independently from each other. As a result, only the first frictional engagement unit 42, only the second frictional engagement unit 44, and both the first and second frictional engagement units 42 and 44 can be engaged, to establish various speed change state shown in FIG. 2, if needed.

In the foregoing, one embodiment of the present invention has been explained with reference to the attached drawings. However, noted is that the present invention can be embodied in other various modes. For example, the above-described embodiment employs the first and second frictional engagement units 42 and 44, and the snap ring 51 interposed therebetween, all of which are arranged in the radially inner space of the clutch drum 40. However, the first and second frictional engagement units 42 and 44, and the snap ring 51 interposed can be arranged in the radially outer space of the clutch hub 48. In this case, the snap ring 51 is fitted to an outer peripheral surface of the clutch hub 48, and the recess portion 51a is formed on an outer peripheral surface thereof.

In addition, the snap ring 51 constructed by single member in the above-described embodiment can be constructed by plural members. In detail, between a pair of C-shape snap rings, a disc shape spacer ring is interposed to form the recess functioning in the same manner as the above-described groove 51a. Further, the snap ring 51 made of the spring steel in the above-described embodiment can be made of material other than the spring steel which is excellent in elastic deforming property.

In addition to the above, the present invention can be carried out in various modes which are modified along knowledge of the skilled person in this field.

What is claimed is:

1. A frictional engagement apparatus comprising:
    a first frictional engagement unit including plural first friction plates,
    a second frictional engagement unit including plural second friction plates and being disposed axially spaced from the first frictional engagement unit,
    one case that supports the first frictional engagement unit and the second frictional engagement unit non-rotatable circumferentially but shiftable axially relative to the one case, and
    one retaining ring fitted to the case so as to be located between the first frictional engagement unit and the second frictional engagement unit, the retaining ring being abutted to a nearest first friction plate and/or a nearest second friction plate to stop an approaching shift of the first frictional engagement unit and/or the second frictional engagement unit,
    wherein the retaining ring includes a u-shaped cross section defined by an annular recess that extends in a circumferential direction of the retaining ring at a radially interior portion of the retaining ring, and
    wherein the annular recess allows the radially interior portion of the retaining ring to elastically deform in an axial direction of the case such that the radially interior portion of the retaining ring decreases in thickness when the first frictional engagement unit and the second frictional engagement unit approach each other.

2. A frictional engagement apparatus according to claim 1, wherein the case is a rotatable clutch drum of a hollow cylindrical shape mounted in an automatic transmission for a vehicle, on an inner peripheral surface of which the first frictional engagement unit and the second frictional engagement unit are supported.

3. A frictional engagement apparatus according to claim 2, wherein the clutch drum has a hollow cylindrical portion on which plural concave grooves that are spaced circumferentially, that extend axially and that are concave in a radially direction of the clutch drum are formed, and each of the first friction plates and each of the second friction plates have a convex portion at an outer periphery thereof to be engaged with the concave grooves.

4. A frictional engagement apparatus according to claim 3, wherein the hollow cylindrical portion is provided with a support groove that supports the retaining ring therein.

5. A frictional engagement apparatus according to claim 2, wherein the retaining ring has a C-shape in a non-fitted state, and is reduced in a diameter upon being fitted in the hollow cylindrical portion.

6. A frictional engagement apparatus according to claim 5,
    wherein the annular recess is formed on an inner peripheral surface of the retaining ring and includes a predetermined width and depth, and
    wherein a first ring portion and a second ring portion are respectively formed on opposite sides of the annular recess in an axial direction of the retaining ring.

7. The frictional engagement apparatus according to claim 6,
    wherein a radially outer portion of the retaining ring abuts a radially interior surface of the case and forms a continuous surface between the first ring portion and the second ring portion, and
    wherein a thickness of the radially outer portion of the retaining ring in the axial direction of the retaining ring remains the same when the first frictional engagement unit and the second frictional engagement unit approach each other.

8. The frictional engagement apparatus according to claim 7,
    wherein the first ring portion and the second ring portion each extend in a radial direction of the retaining ring, and
    wherein at least one of the first ring portion and the second ring portion deform towards the annular recess when the first frictional engagement unit and the second frictional engagement unit approach each other.

9. A frictional engagement apparatus according to claim 5, wherein a radially outer part of the first friction plate nearest to the retaining ring, and a radially outer part of the second friction plate nearest to the retaining ring are abutted to the retaining ring.

10. A frictional engagement apparatus according to claim 9, further comprising a first piston and a second piston that respectively press the first frictional engagement unit and the second frictional engagement unit to the retaining ring,
    wherein the first piston and the second piston are operated independently from each other.

11. The frictional engagement apparatus according to claim 1, wherein the retaining ring is constructed as a single member.

* * * * *